(12) United States Patent
Jain et al.

(10) Patent No.: US 8,738,961 B2
(45) Date of Patent: May 27, 2014

(54) HIGH-AVAILABILITY COMPUTER CLUSTER WITH FAILOVER SUPPORT BASED ON A RESOURCE MAP

(75) Inventors: Reshu Jain, Sunnyvale, CA (US); Prasenjit Sarkar, San Jose, CA (US); Mark James Seaman, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 12/858,436

(22) Filed: Aug. 17, 2010

(65) Prior Publication Data

US 2012/0047394 A1 Feb. 23, 2012

(51) Int. Cl.
*G06F 11/00* (2006.01)

(52) U.S. Cl.
USPC ........................................................ 714/4.11

(58) Field of Classification Search
USPC ........................................................ 714/4.11
See application file for complete search history.

(56) References Cited

U.S. PATENT DOCUMENTS

| | | | |
|---|---|---|---|
| 6,334,196 B1 | 12/2001 | Smorodinsky et al. | |
| 6,393,485 B1 | 5/2002 | Chao et al. | |
| 6,438,705 B1 * | 8/2002 | Chao et al. | 714/4.11 |
| 7,305,578 B2 | 12/2007 | Baba et al. | |
| 7,418,627 B2 | 8/2008 | Baba | |
| 7,444,536 B1 | 10/2008 | Jairath | |
| 7,464,302 B2 | 12/2008 | Chen et al. | |
| 7,603,256 B2 | 10/2009 | Cheng et al. | |
| 7,860,964 B2 * | 12/2010 | Brady et al. | 709/223 |
| 2002/0032883 A1 * | 3/2002 | Kampe et al. | 714/16 |
| 2002/0198996 A1 | 12/2002 | Sreenivasan et al. | |
| 2004/0158777 A1 * | 8/2004 | Bae et al. | 714/47 |
| 2005/0181835 A1 * | 8/2005 | Lau et al. | 455/567 |
| 2005/0192035 A1 * | 9/2005 | Jiang | 455/461 |
| 2006/0045098 A1 * | 3/2006 | Krause | 370/396 |
| 2006/0085668 A1 * | 4/2006 | Garrett | 714/4 |
| 2006/0190775 A1 * | 8/2006 | Aggarwal et al. | 714/100 |
| 2008/0016115 A1 * | 1/2008 | Bahl et al. | 707/104.1 |
| 2008/0215910 A1 | 9/2008 | Gabriel et al. | |
| 2008/0253283 A1 * | 10/2008 | Douglis et al. | 370/228 |
| 2008/0275975 A1 * | 11/2008 | Pandey et al. | 709/223 |
| 2009/0106571 A1 * | 4/2009 | Low et al. | 713/310 |
| 2010/0180161 A1 * | 7/2010 | Kern et al. | 714/47 |
| 2011/0022812 A1 * | 1/2011 | van der Linden et al. | 711/163 |

FOREIGN PATENT DOCUMENTS

| | | |
|---|---|---|
| EP | 1024428 A3 | 8/2000 |
| EP | 1320217 B1 | 10/2004 |
| JP | 2007179310 A2 | 7/2007 |

* cited by examiner

*Primary Examiner* — Yair Leibovich
(74) *Attorney, Agent, or Firm* — Kenneth L. Sherman, Esq.; Michael Zarrabian, Esq.; Sherman & Zarrabian LLP

(57) ABSTRACT

Embodiments of the invention relate to handling failures in a cluster of computer resources. The resources are represented as nodes in a dependency graph in which some nodes are articulation points and the removal of any articulation point due to a resource failure results in a disconnected graph. The embodiments perform a failover when a resource corresponding to an articulation point fails. The failover is to a local resource if the failed resource does not affect all local resources. The failover is to a remote resource if no local resource can meet all resource requirements of the failed resource, and to a remote resource running in a degraded mode if the remote resource cannot meet all of the requirements.

17 Claims, 8 Drawing Sheets

HIGH-AVAILABILITY COMPUTER CLUSTER WITH FAILOVER SUPPORT BASED ON A RESOURCE MAP

The invention relates generally to cluster computing, and more particularly to handling failures in a high-availability computer cluster.

BACKGROUND

Data centers generally rely on high-availability computer clusters, e.g., IBM High Availability Cluster Multi-Processing (HACMP) systems, to provide continuous computing services. High-availability computer clusters are networks of computers that are specially configured for the purpose of providing uninterrupted availability of computing resources in case of failures in one or more resources. These resources may include servers, networks interconnecting the servers, storage subsystems, storage area networks (SANs) and other hardware and software components supporting the operation of the cluster storage network switches, and server application programs. Computer clusters typically employ redundant components, e.g., server (nodes), networks, switches and data storage systems, that are set up to automatically switch over to a functioning component when a component of a similar type fails. The automatic switching to operational resources to provide uninterrupted services is referred to as a failover. The failover allows the cluster to continue providing the same computing services to hardware and software components that were receiving services from the failed component before the failure. Normally, when a computer hosting a particular application fails, the application will be unavailable to the users until the failed computer is serviced. A high-availability cluster avoids service interruption by monitoring for faults in the computers and networks, and immediately restarting the application on another computer in the cluster when it detects a fault without requiring administrative intervention.

In order to provide failover support, a data center typically employs a cluster management software component that closely manages resources and groups of resources in the cluster. The cluster management software component configures resources in a cluster before their operation and monitors their status and performance characteristics during the operation. In the event of a failure of a resource, the services provided by the failed resource are migrated to another cluster resource to continue supporting components and applications receiving the services. Typically, resources and resource groups are transferred to a surviving computing node without regard for whether or not that action will resolve the issue that caused the failover in the first place.

In geographically separated clusters, an efficient failover process becomes more significant when both local and remote components are involved in a failover and affect the effectiveness of the failover. Most geo-cluster configurations will first try to failover resource groups locally. Only in the case of local failure of a resource group that the resource group is geographically migrated to the remote site. Since each resource group failover causes the resource group to be stopped and restarted on the node to which it is migrated, application downtime results for each attempt at resource group failover. Obviously, minimizing the number of failover attempts reduces the total application outage.

BRIEF SUMMARY

Exemplary embodiments of the present invention relate to a high-availability computer cluster. More particularly, the embodiments provide a method, computer program product, and system for handling failures of resources in a computer cluster based on a map of resources and resource groups. The exemplary embodiments of the invention represent computer resources as nodes in a dependency graph, where some of the nodes are articulation points in the graph, and perform a failover for a failed resource if the failed resource corresponds to an articulation point. The failover is to a local resource if the failed resource does not affect all of the local resources and to a remote resource if the remote resource can meet the resource requirements of the failed resource. If a remote resource cannot meet all of the resource requirements of the failed resource, then the failover is to a remote resource that operates in a degraded mode.

The details of the preferred embodiments of the invention, both as to its structure and operation, are described below in the Detailed Description section in reference to the accompanying drawings, in which like reference numerals refer to like parts. The Summary is intended to identify key features of the claimed subject matter, but it is not intended to be used to limit the scope of the claimed subject matter.

DETAILED DESCRIPTION

The present invention relates generally to high-availability computer clusters. More particularly, the invention concerns a high-availability computer cluster, method, and computer program product for providing failover support based on a resource map. Cluster computing environments typically operate by including redundant computer systems or nodes which are activated to provide continuing services when one or more system components fail. Exemplary embodiments of the invention provide methods and systems for providing high availability by examining associated characteristics of different local and remote failover resources and determining the best failover resource based on the resource map. High availability in a cluster environment is implemented for the purpose of improving the availability of services which the cluster provides.

Normally, when a server hosting a particular application fails, the application is unavailable until a service personnel repairs or replaces the failed system. High-availability clusters, however, remedy this situation by detecting hardware and software failures as they occur and immediately starting the application on another system without requiring human intervention through a failover operation. The failover is often transparent to the user and the user does not experience any loss of data.

Figure 1:
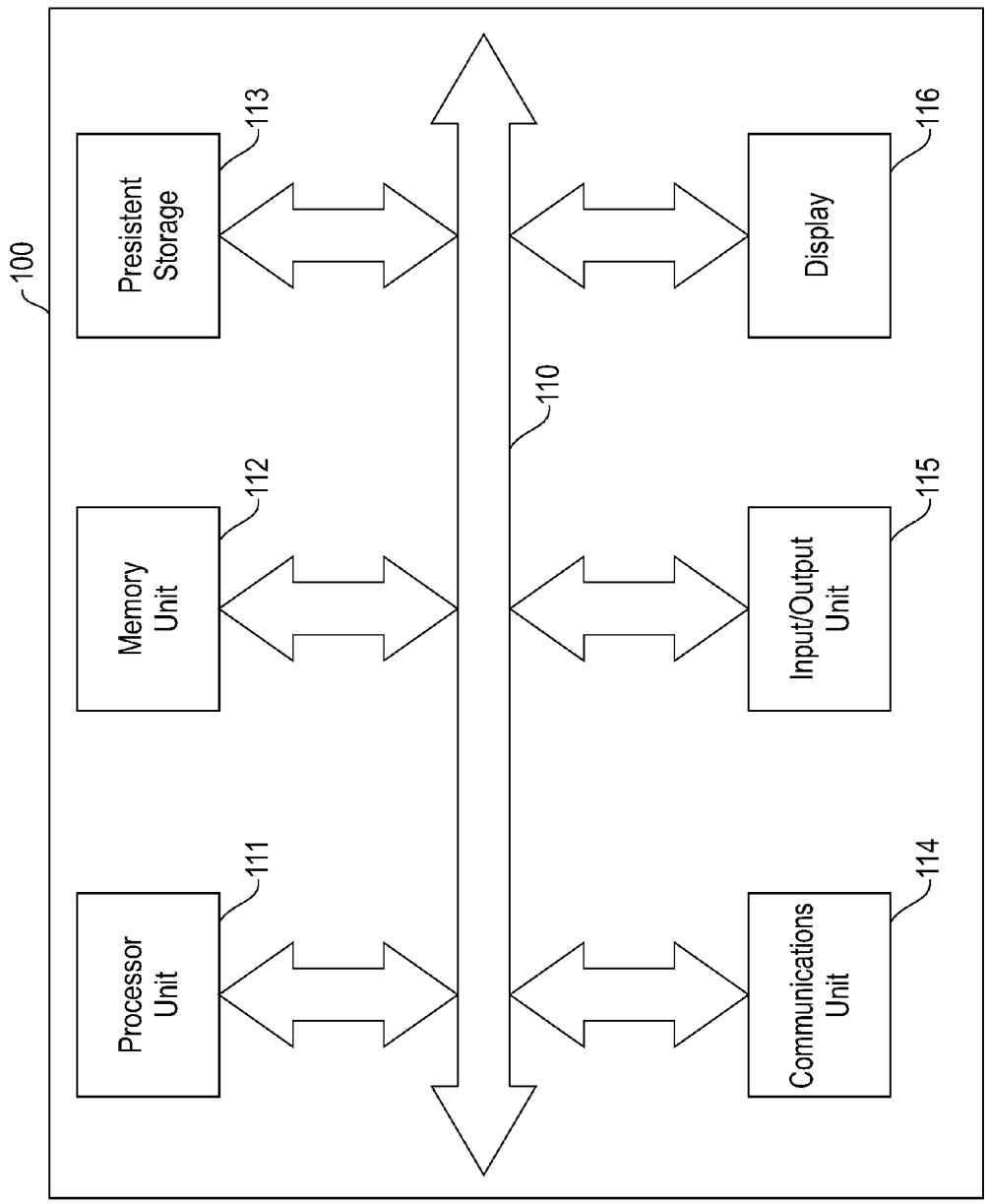
FIG. 1 is a block diagram of a computer system which may be a server node in a cluster of computers in which aspects of the present invention are implemented.

Referring now to FIG. 1, there is illustrated a block diagram of a data processing system that may be used as a server node in a computer cluster. Data processing system 100 includes a processor unit 111, a memory unit 112, a persistent storage 113, a communications unit 114, an input/output unit 115, a display 116, and system bus 110. Computer programs are typically stored in persistent storage 113 until they are needed for execution, at which time the programs are brought into memory unit 112 so that they can be directly accessed by processor unit 111. Processor 111 selects a part of memory 112 to read and/or write by using an address processor 111 gives to memory 112 along with a request to read and/or write. Usually, the reading and interpretation of an encoded instruction at an address causes processor 111 to fetch a subsequent instruction, either at a subsequent address or some other address. process.

High-Availability Clusters

Figure 2:
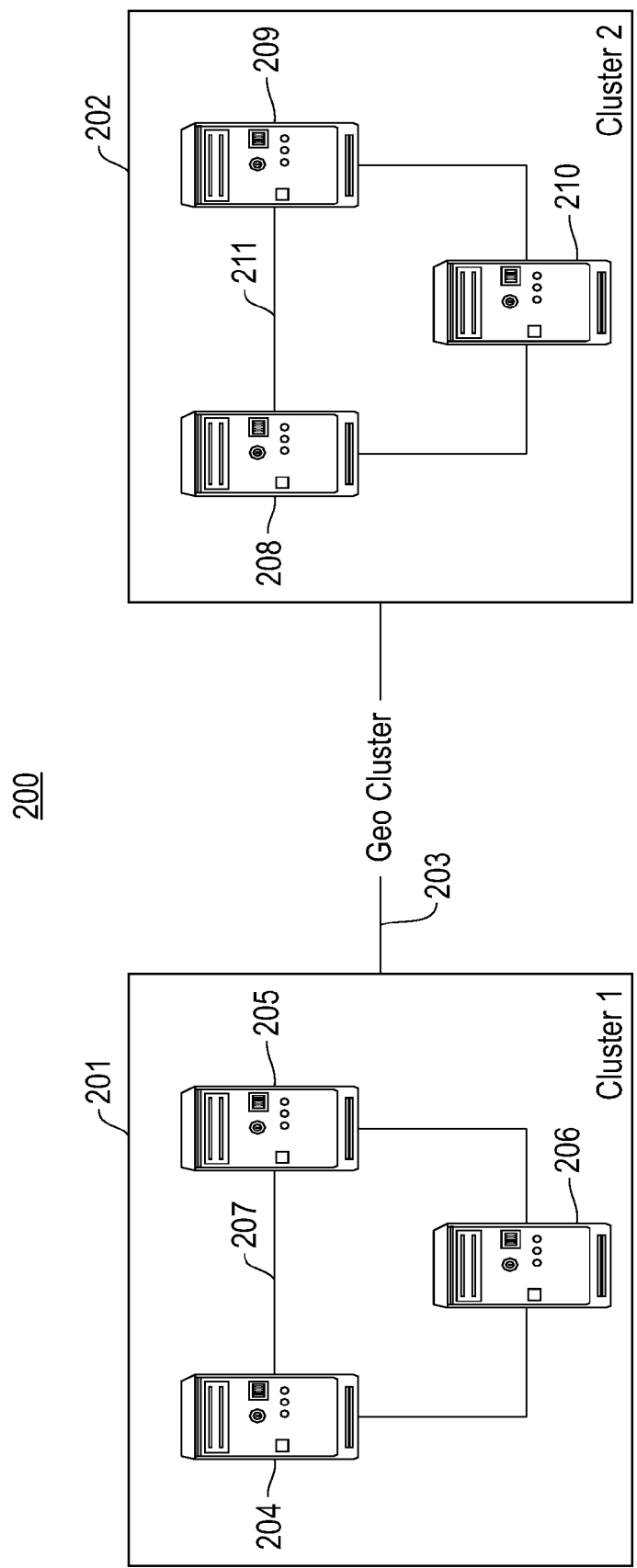
FIG. 2 is a block diagram of a representative computer cluster in which aspects the present invention may be implemented.

As business enterprises depend more on computing systems to support their operations, high-availability computing clusters become critical parts of the systems to help avoid outages. High-availability clusters are often used for critical databases, file sharing on enterprise networks, business applications, and customer services such as as electronic commerce websites. FIG. 2 shows a simple cluster environment 200 in which aspects the present invention may be implemented. As an example, the cluster environment 200 has two clusters, cluster 201 and cluster 202, which are physically remote from each other and connected by a network link 203. Cluster 201 includes computers 204-206 which are interconnected by a local network 207. Similarly, cluster 202 includes computers 208-210 which are interconnect by local area network 211. Each of computers 204-206 and 208-210 may support one or more server applications that are considered as resources in the cluster 200. Some of the applications may have certain inter-dependencies and belong a resource group. Cluster resources and resource groups are described further below with reference to FIGS. 3-7.

Cluster implementations commonly rely on redundant components to eliminate single points of failure, including multiple network connections and data stores that are connected via multiple storage area networks. A cluster may include disk mirroring to provide continued access to data when a disk crashes. Redundant storage area networks (SANs) may also provide alternate access paths to storage devices due to connection failures. In addition, the cluster may have redundant network connections to allow uninterrupted communications among the cluster components when there is a network outage. In order to keep track of the operational status of components, a cluster may use some form of network monitor such as a heartbeat process.

Failover

A failover involves moving resources from one computing node to another node. Other resources in a cluster may be involved when a server node fails such as disk volumes, IP addresses, application processes, subsystems, print queues, etc. In order to properly determine whether a failover is to a local node or a remote node, and whether a remote resource may satisfy all resource requirements of the failed resource, exemplary embodiments of the invention maintain a resource map in the form of a dependency graph. The resource map includes articulation points corresponding to resources that when an articulation point is removed, due to the failure of a corresponding resource, the resource graph becomes disconnected. As a result, a running application state cannot be reached through this resource graph.

Failures in a computing cluster may occur due to operator errors, software bugs, or hardware defects. In case of a computer node failure, the workload intended for the failed node may be directed to another node or balanced across the remaining nodes. Alternatively, a previously inactive node may be brought online to handle the workload of the failed node. If a cluster node with a running application fails, another instance of the application will be brought up on another node, and the network address used to access the application will be brought up on the new node to allow continued access to the application. This application is considered a cluster resource.

Figure 3:
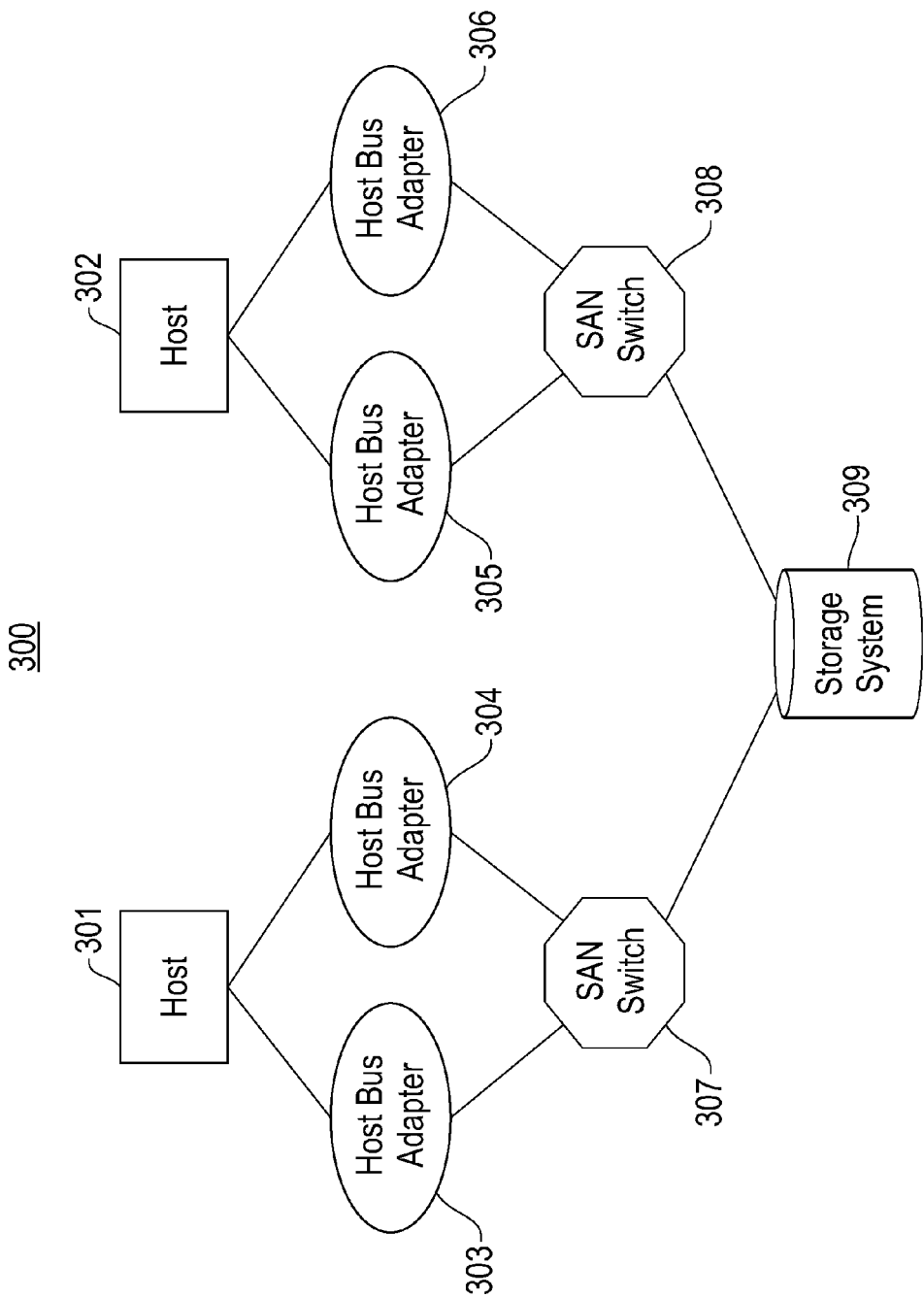
FIG. 3 is a block diagram of a computer cluster having different types of computer resources according to an exemplary embodiment of the invention.

FIG. 3 illustrates a block diagram of an exemplary computer cluster 300 having different types of computer resources and redundant components in which aspects of the present invention may be implemented. The cluster 300 has multiple computer nodes (e.g., servers) 301-302 that are attached to storage area network (SAN) switches 307-308 through node host bus adapters 303-306. Node host bus adapters 303-306 may be part of host support systems or of SAN switches 307-308, depending on the packaging of the products used in cluster 300. SAN switches 307-308 are connected to one or more data storage system 309 which may be, for example, a DASD device, a RAID system, or a tape library system. Nodes 301-302 each has two paths to storage system 309 in case one of the SAN switches 307-308 fails. For example, when SAN switch 307 crashes and interrupts network traffic through host bus adapter 303 and SAN switch 307, node 301 still can access storage system 309 through host bus adapter 305 and SAN switch 308. Similarly, if network traffic through host bus adapter 304 and switch 307 is disrupted due to a failure of SAN switch 307, node 302 still can access storage system 309 through the path connecting host bus adapter 306 and SAN switch 308.

Figure 4:
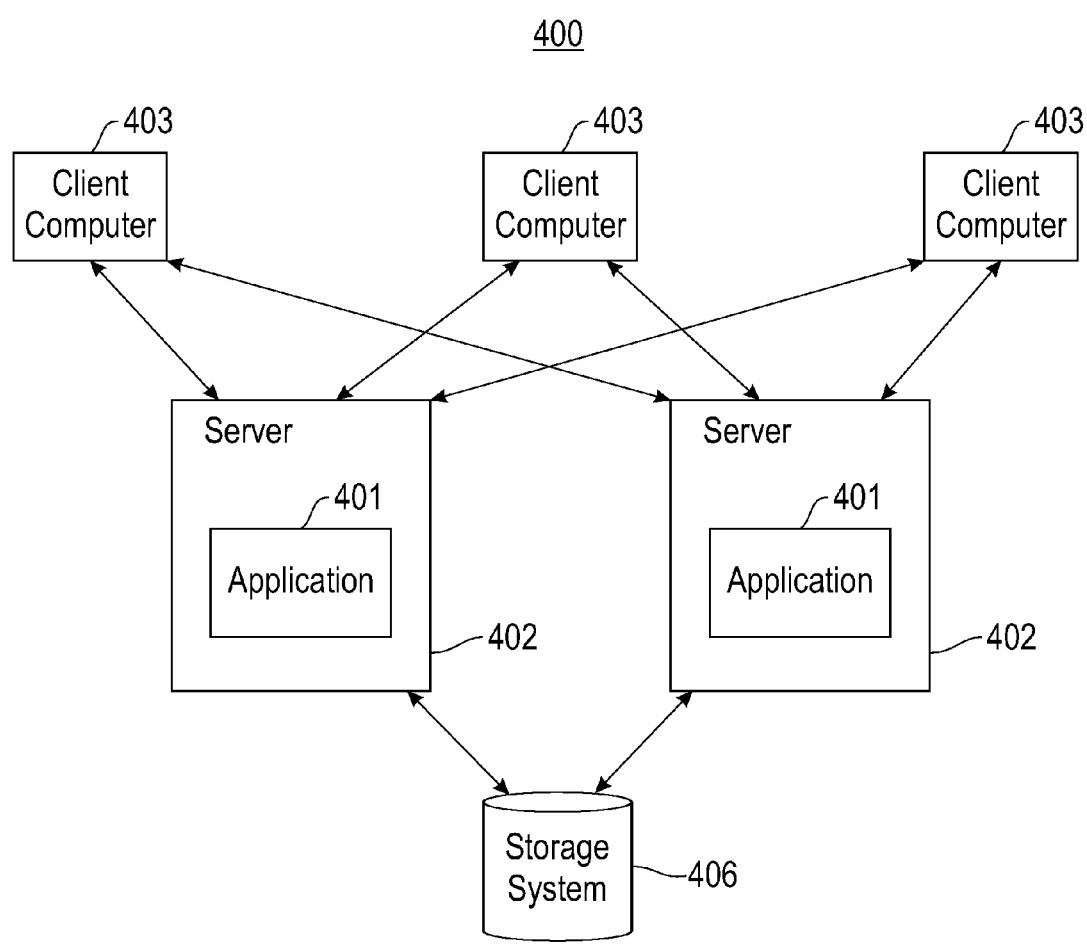
FIG. 4 is an a generalized server cluster having server applications running on cluster servers, in which aspects of the present invention may be implemented.

FIG. 4 shows a generalized server cluster 400 and server applications 401 running on servers 402. Like computer hardware components in a cluster, server applications 401 are considered as resources in the cluster 400. If one of the server applications 401 fails, a hardware component supporting the application fails, or an entire server fails, another server within the server cluster 400 will execute the application from the point at which the failure occurred. As such, a client 403 will not experience any interruption or will experience minimal interruption of the services provided by the server cluster 400. To achieve this high availability of computer services, server cluster control software 404 monitors and controls applications 401 running in the cluster 400 and can restart applications 401 in response to a variety of hardware or software faults.

The server cluster 400 generally includes all servers with the same cluster identification and connected to one another via a set of redundant heartbeat networks, e.g., one or more public or private networks 405. All nodes 402 in the cluster 400 are constantly aware of the status of all resources on all other nodes. Applications 401 can be configured to run on specific nodes 402 in the cluster 400. A storage system 406 may be configured to provide access to shared application data for those servers 402 hosting the applications. In that respect, the actual storage system connectivity will determine where applications can be executed. The nodes 402 sharing access to storage within the storage system 406 will be eligible to execute a common application and are able to failover such applications. Nodes 402 without common storage cannot failover an application that stores data to disk.

Resources and Resource Groups

Within the server cluster 400, resources are defined as hardware or software entities such as disks, network interface cards, IP addresses, applications and databases that are controlled by the cluster control software 404. Controlling a resource includes bringing the resource online, taking the resource offline as well as monitoring the status of the resource. Resources are classified according to types and multiple resources can be a single type. Each resource is identified by a name that is unique among all resources in the cluster. The cluster control software 404 includes a set of predefined resource types. Resources in a cluster are managed by a set of software components that together provide a comprehensive clustering environment, such as IBM Reliable Scalable Cluster Technology (RSCT) for Linux and AIX environments. RSCT is an infrastructure for providing the clusters with improved system availability and scalability. The RSCT monitors and manages the resources of a system or a cluster of nodes. It also coordinates security, configuration and cross node/process tasks in the cluster.

A resource group is a collection of resources that depend on each other to provide application services to clients and are managed as a single unit with respect to failover. An example of a resource group includes application programs and related network names, and IP addresses. A Web application resource group may consist of a storage system which stores the web pages returned in response to client requests, a database containing related files, network cards, and associated IP addresses. The cluster control software 404 performs administrative operations on resources, including starting, stopping, restarting and monitoring at the service program level. Resource group operations initiate administrative operations for all resources within the group. For example, when a resource group is brought online, all resources within the group are brought online. When a failover occurs in the server cluster 400, resources do not failover individually. The entire resource group that the resource is a member of is the unit of a failover. If there is more than one resource group defined on a server 402, one group may failover without effecting the other group or groups executing on the server 402. From a cluster standpoint, there are two significant aspects to this view of an application resource group as a collection of resources. First, if the resource group is to run on a particular server, all the resources the group requires must be available to the server. Second, the resources comprising a resource group have interdependencies; that is, some resources (e.g., volumes) must be operating before other resources (e.g., the file system), could be operational.

Resource dependencies may determine the order that specific resources within a resource group are brought online or offline when the resource group is brought online or offline. The relationships among resources in cluster 400 are relevant because, for example, it is not useful to move an application to one server node 402 when the data it uses is moved to another server node. In a typical cluster system, such as IBM High Availability Cluster Multi-Processing systems, resource relationship information is generally maintained in a cluster-wide data file.

Figure 5:
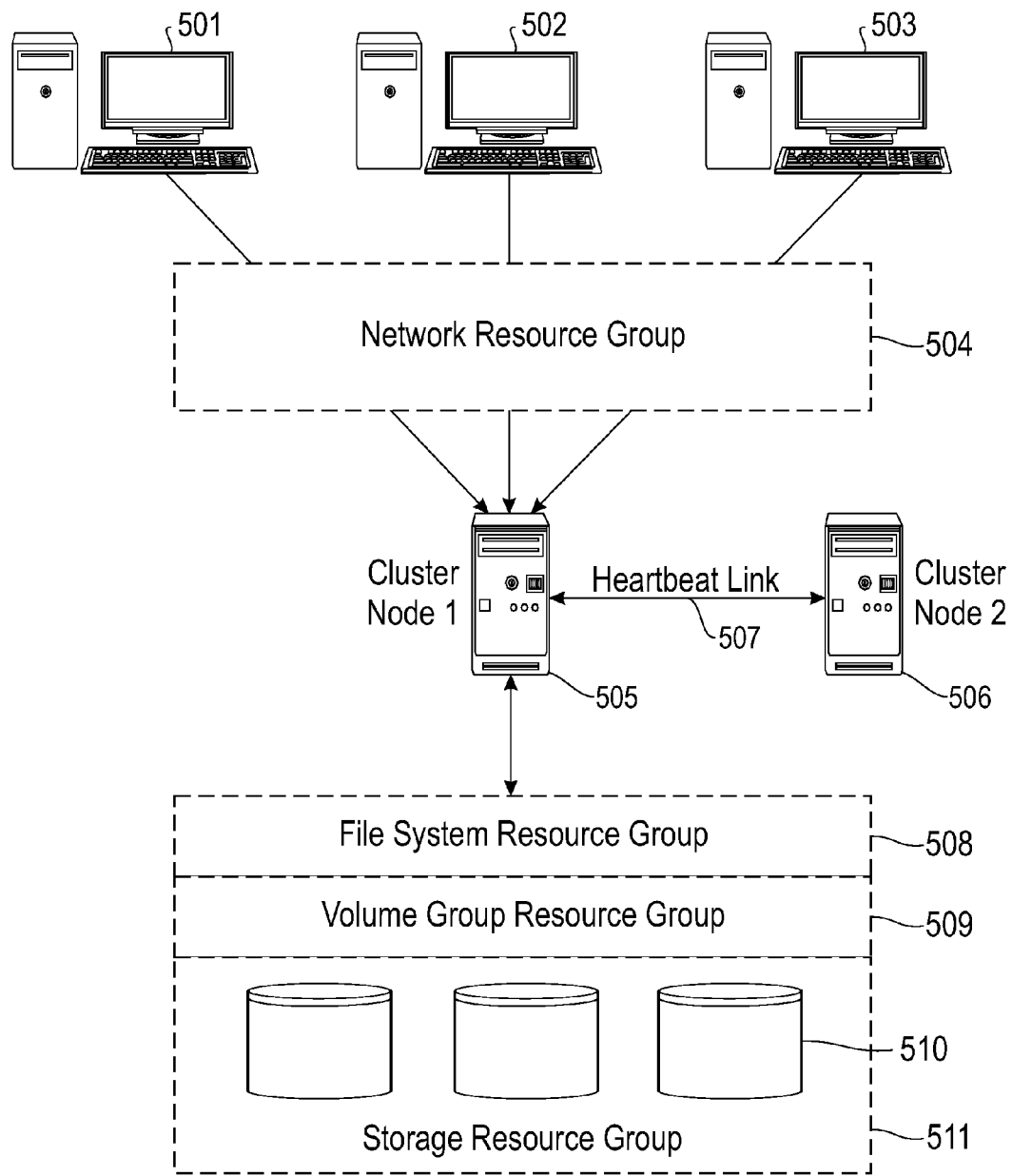
FIG. 5 illustrates examples of resources and resource groups in a cluster serving a network file system for a group of client computers, according to an illustrated embodiment of the invention.

FIG. 5 shows an example computer cluster with multiple resource groups in which aspects of the invention may be implemented for handling failovers. The illustrated cluster has two server nodes 505 and 506, which are connected by a heartbeat network 507, and assigned resource groups. Client computers 501-503 access data in shared storage systems 510 through cluster server 505. Clients computers 501-503 are connected to server 505 through one or more networks represented by network resource group 504. Further, client computers 501-503 typically access data in storage systems 510 through a network file system which is represented by file system resource group 508. In storage systems 510, data is generally organized as storage volumes to facilitate the management of data in the storage systems. These storage volumes are represented as volume resource group 509, while the storage systems 510 are represented by storage resource group 511. The cluster of FIG. 5 allows both server nodes 505-506 to access data needed for the file system running in the cluster. A cluster control software may configure resource group 504 as a stand-alone resource that failovers between server 505 and server 505, as necessary. The cluster control software may configure cluster resources 508, 509, 510, and 511, which depend on each other and have different resource types, as a single resource group. Resources 502 through 511 may need to be initiated in a particular sequence for the group to function. Should a resource fail, the graph is analyzed to see if the primary server node 505 can still reach an operational application state, as described below with reference to FIGS. 6 and 7. If the primary node 505 could reach an operational application state, then the corresponding resource map does not have any articulation point and the application can continue to run in the cluster. However, if the failed resource is an articulation point, then a failover operation is required since the operational application state cannot be reached.

Figure 6:
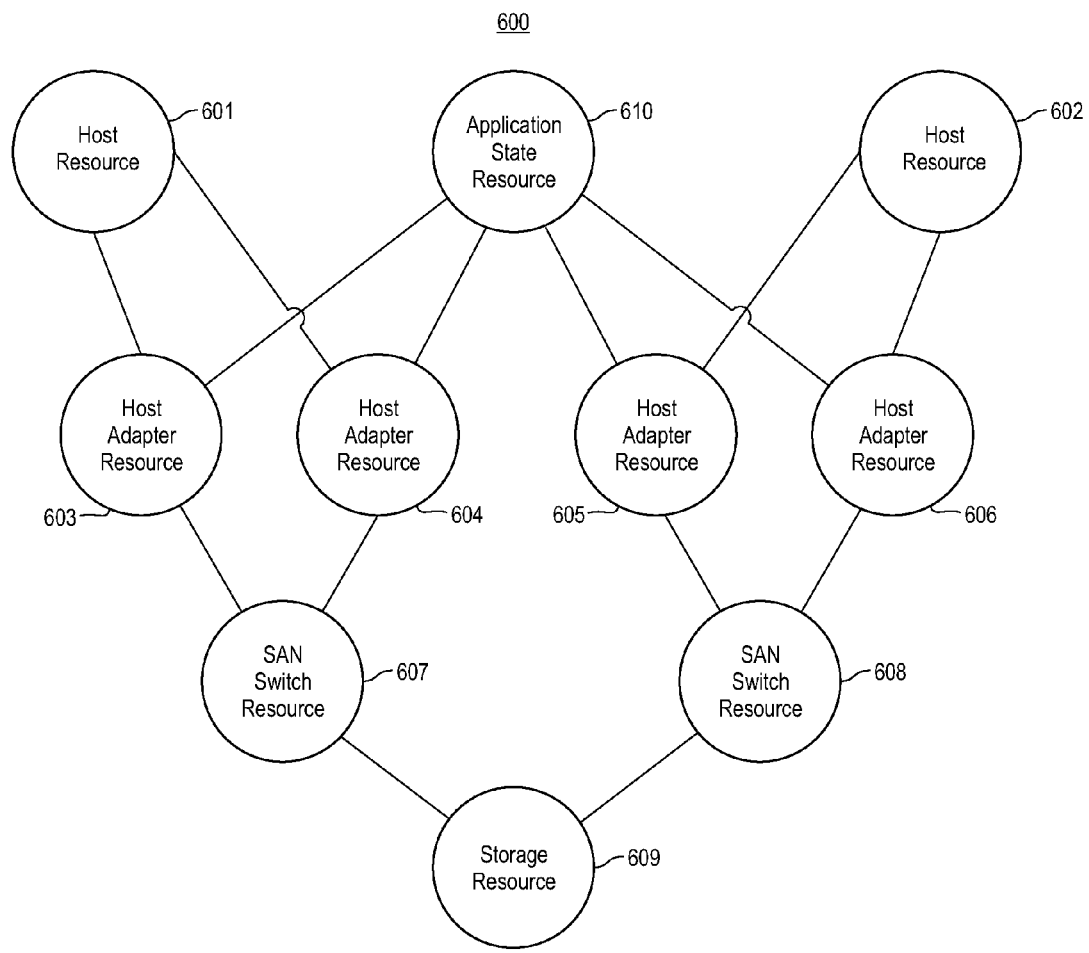
FIG. 6 is a resource graph representing the computer cluster of FIG. 3 according to an exemplary embodiment of the invention.

FIG. 6 shows an example of a resource map 600 that represents cluster 300 shown in FIG. 3. Graph nodes 601 and 602 of resource map 600 respectively represent host nodes 301 and 302 in FIG. 3. Graph nodes 603 through 606 respectively correspond to host bus adapters 303 through 306 of cluster 300 in FIG. 3. Similarly, graph nodes 607 and 608 respectively represent SAN switches 307 and 308, and graph node 609 represents storage system 309 of cluster 300. As an example of application resources running in cluster 300, resource map 600 further shows node 610 that corresponds to the operational state of an application running in the cluster represented by map 600. The application represented by node 610 may be, for example, a Web application for serving Web pages to client computers that request these pages from servers 301 and 302. Graph nodes 607 and 608, which respectively represent SAN switches 307 and 308 in FIG. 3, are referred to as articulation points in the resource map 600 because the removal of either node 607 or node 608 from resource map 600 would result in a disconnected graph. Each of the articulation points 607 and 608 represents a resource that when this resource fails, the cluster would not be able to satisfy the requirements of the resource groups in cluster. A resource graph that contains no articulation point is referred to as a biconnected graph.

Figure 7:
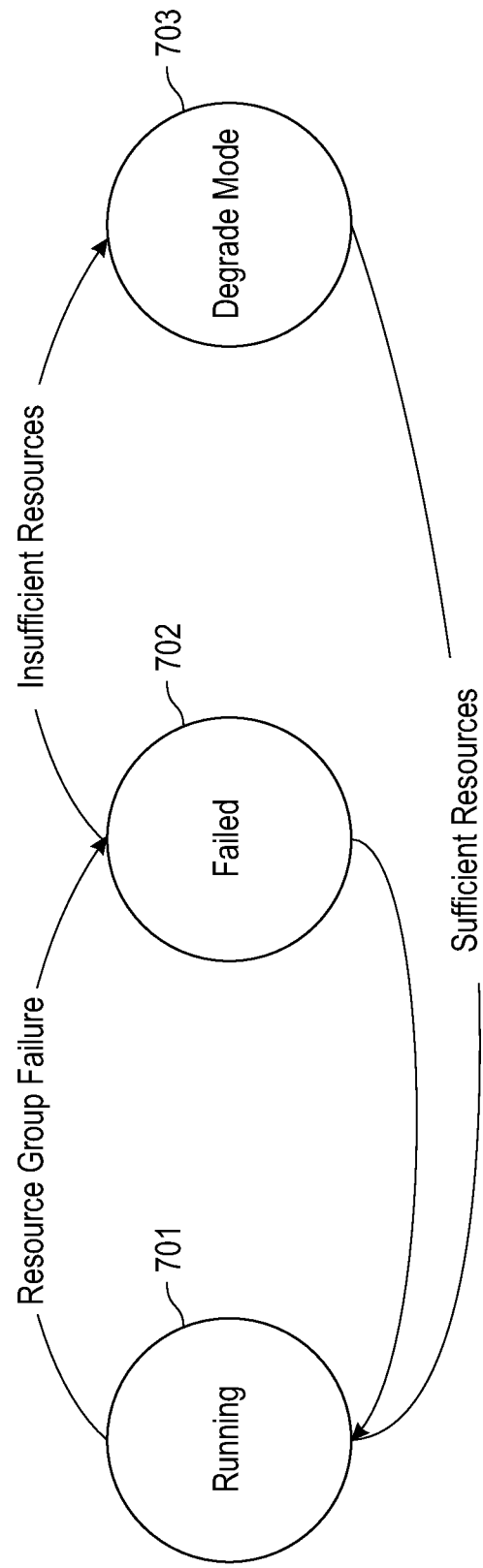
FIG. 7 is a state diagram of an application running in a cluster with failover support according to an exemplary embodiment of the invention.

FIG. 7 illustrates a state diagram of an application running in a cluster with failover support according to an exemplary embodiment of the invention. As a cluster resource group fails, the application state changes from running state 701 to failed state 702. If the failover is to a local or remote resource that could satisfy all resource requirements of the failed resource group, then the application returns to running state 701. If the failover resource can only satisfy some of the resource requirements, then the failover still occurs, but the failover resource runs in a degraded mode 703. Once all of the resource requirements are met by another failover resource in the cluster, then the application could return to running state 701.

Figure 8:
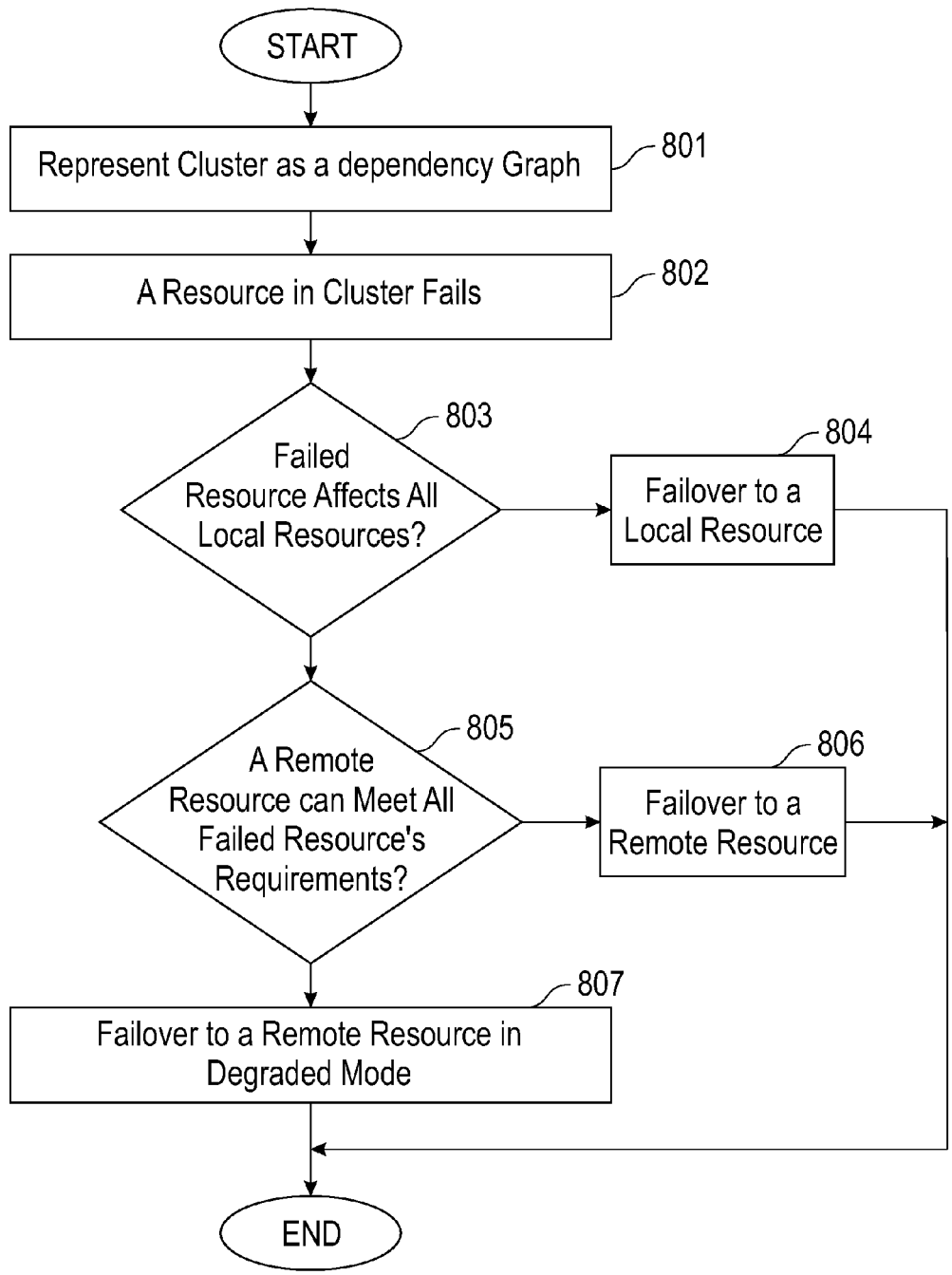
FIG. 8 is a flow chart of an exemplary process for handling failures in a high-availability computer cluster, in accordance with aspects of the invention.

FIG. 8 is a flow chart of a process for performing a failover in a computer cluster in accordance with an exemplary embodiment of the invention. At step 801, the process represents the configuration of the cluster as a dependency topology graph in which nodes in the graph respectively correspond to resources in the cluster. Some nodes in the dependency graph are considered as articulation points, which represent resources that are single points of failure in the cluster. The articulation points may be outside of the typical host side purview. The represented resources may include SAN switches, network hubs and routers, network backbone switches, storage subsystems, and other data center equipment. In case one of the resources in the cluster fails, per step 802, the illustrated process determines at step 803 whether the failed resource affects all local resources. An example of this situation is when a storage subsystem fails. By definition, both nodes of the cluster must share the storage subsystem in order to share storage resources. The significance of the resources that are single points of failure in the cluster is that a failure of any of these resources would result in the removal of a corresponding articulation point from the resource graph. As a result, the resource graph becomes a disconnected graph.

If the failed resource does not affect all of the local resources, then at step 804, the cluster fails over to an unaffected local resource to continue providing the services that the failed resource was providing before failure. An example of this scenario is when multiple paths to a storage subsystem exist through multiple SAN edge switches and will survive the failure of a single SAN switch. In case the failed resource affects all local resources in the cluster, then the process determines at step 805 whether or not a remote resource could satisfy all of the resource requirements of the failed resource. If there is a remote resource that could meet all of the failed resource's requirements, then the process fails over to that remote resource which then provides the same resource requirements, at step 806. An example of this scenario is when a data center resource fails, e.g., a local storage subsystem, and the only solution is to failover geographically to a remote resource that could provide all of the resource requirements. If a remote resource can only satisfy some of the resource requirements, then the failover is to that remote resource, but that remote resource would operate in a degraded mode as shown by step 807. The degraded mode may provide only a subset of the resource requirements that the failed resource was providing. For example, an application runs on a server node in the cluster and is using 2 GB of memory out of the 3 GB of memory resource that the server has. If another application also requires 2 GB of memory resource for its operation, then this second application would be running in a degraded mode with only 1 GB of memory available to it.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

As will be appreciated by one skilled in the art, aspects of the present invention may be embodied as a method, system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a micro-processor of a general purpose computer, special purpose computer, or other programmable data processing apparatus to produce a machine, such that the instructions, which execute via the micro-processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described above illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
representing a cluster of computer resources as nodes in a dependency graph, the nodes including a plurality of articulation points, wherein removal of an articulation point due to a resource failure results in a disconnected dependency graph;
if a failed resource corresponds to an articulation point, performing a failover for a resource group that the failed resource is a member, wherein all of the nodes in a cluster are aware of status of all resources on all other nodes, and
if a failover remote resource only satisfies a portion of all resource requirements, then failover still occurs and the failover remote resource runs in a degraded mode,
wherein the resources comprise local resources and the failover is to a local resource if the failed resource does not affect all of the local resources, and upon a resource failing, analyzing the dependency graph to determine if an operational state of a primary node is reachable.

2. The method of claim 1, wherein the resources comprise remote resources, each resource is associated with a plurality of resource requirements, and the failover is to a remote resource if the remote resource can meet the resource requirements of the failed resource, wherein all of the nodes in a cluster are constantly aware of status of all resources on all other nodes.

3. The method of claim 2, wherein, performing a failover comprises performing failover for resources of an entire resource group that the failed resource is a member.

4. The method of claim 2, wherein the remote resource is part of a remote computer cluster, wherein failover comprises moving resources from one node to another node, and wherein resource dependencies determine an order that specific resources within a resource group are brought online or offline when the resource group is brought online or offline.

5. The method of claim 2, wherein the resource requirements are selected from the group consisting of: CPU requirements, memory requirements, and disk performance requirements.

6. The method of claim 1, wherein the computer resources comprise computer nodes.

7. The method of claim 1, wherein the computer resources comprise data storage systems.

8. The method of claim 1, wherein the computer resources comprise storage area networks (SANs).

9. The method of claim 1, wherein the computer resources comprise computer networks and network devices.

10. The method of claim 1, wherein the cluster is part of a data center computer system.

11. The method of claim 1, wherein the failed resource is associated with a plurality of actions to be performed by the cluster in case of a failover, wherein upon an application failing in a cluster, another resource in the cluster executes the application from a point where a failure occurred.

12. A system comprising:
a plurality of interconnected computer resources;
logic using a hardware processor for representing the computer resources as nodes in a dependency graph, the nodes including a plurality of articulation points wherein removal of an articulation point due to a resource failure results in a disconnected dependency graph; and
logic for performing a failover for a resource group that a failed resource is a member if the failed resource corresponds to an articulation point, wherein all of the nodes in a cluster are aware of status of all resources on all other nodes, wherein if a failover of a remote resource only satisfies a portion of all resource requirements, then failover still occurs and the failover remote resource runs in a degraded mode,
wherein the resources comprise local resources and the failover is to a local resource if the failed resource does not affect all of the local resources, wherein upon a resource failing, analyzing the dependency graph to determine if an operational state of a primary node is reachable, and wherein resource dependencies determine an order that specific resources within a resource group are brought online or offline when the resource group is brought online or offline.

13. The system of claim 12, wherein the resources comprise remote resources, each resource is associated with a plurality of resource requirements, and the failover is to a remote resource if the remote resource can meet the resource requirements of the failed resource, wherein all of the nodes in a cluster are constantly aware of status of all resources on all other nodes, and failover comprises moving resources from one node to another node.

14. The system of claim 13, wherein a failover comprises failover of resources of an entire resource group that the failed resource is a member.

15. A computer program product comprising a computer readable hardware storage device having computer readable program code embodied therewith, the computer readable program code comprising:
   computer readable program code configured to represent the computer resources as nodes in a dependency graph, the nodes including a plurality of articulation points wherein removal of an articulation point due to a resource failure results in a disconnected dependency graph; and
   computer readable program code configured to perform a failover for a resource group that a failed resource is a member if the failed resource corresponds to an articulation point, wherein all of the nodes in a cluster are aware of status of all resources on all other nodes, wherein if a failover remote resource only satisfies a portion of all resource requirements, then failover still occurs and the failover remote resource runs in a degraded mode,
wherein the resources comprise local resources and the failover is to a local resource if the failed resource does not affect all of the local resources, wherein upon a resource failing, analyzing the dependency graph to determine if an operational state of a primary node is reachable, and wherein resource dependencies determine an order that specific resources within a resource group are brought online or offline when the resource group is brought online or offline.

16. The computer program product of claim 15, wherein the resources comprise remote resources, each resource is associated with a plurality of resource requirements, and the failover is to a remote resource if the remote resource can meet the resource requirements of the failed resource, wherein all of the nodes in a cluster are constantly aware of status of all resources on all other nodes, and wherein failover comprises moving resources from one node to another node.

17. The computer program product of claim 16, wherein comprises failover of resources of an entire resource group that the failed resource is a member.

* * * * *